US012636823B2

(12) United States Patent
Ettlinger

(10) Patent No.: US 12,636,823 B2
(45) Date of Patent: May 26, 2026

(54) DISCHARGE TECHNOLOGY FOR PLASTIC FILTERS

(71) Applicant: ETTLINGER KUNSTSTOFFMASCHINEN GMBH, Königsbrunn (DE)

(72) Inventor: Roderich Ettlinger, Augsburg (DE)

(73) Assignee: ETTLINGER KUNSTSTOFFMASCHINEN GMBH, Königsbrunn (DE)

( * ) Notice: Subject to any disclaimer, the term of this patent is extended or adjusted under 35 U.S.C. 154(b) by 393 days.

(21) Appl. No.: 18/258,840

(22) PCT Filed: Dec. 1, 2021

(86) PCT No.: PCT/EP2021/083748
§ 371 (c)(1),
(2) Date: Jun. 22, 2023

(87) PCT Pub. No.: WO2022/135855
PCT Pub. Date: Jun. 30, 2022

(65) Prior Publication Data
US 2024/0051211 A1 Feb. 15, 2024

(30) Foreign Application Priority Data

Dec. 23, 2020 (DE) ..................... 20 2020 107 526.8

(51) Int. Cl.
B29C 48/694 (2019.01)
B01D 33/06 (2006.01)
B01D 33/74 (2006.01)

(52) U.S. Cl.
CPC ............ *B29C 48/694* (2019.02); *B01D 33/06* (2013.01); *B01D 33/74* (2013.01)

(58) Field of Classification Search
None
See application file for complete search history.

(56) References Cited

U.S. PATENT DOCUMENTS

| | | | | |
|---|---|---|---|---|
| 9,815,006 B2 * | 11/2017 | Ettlinger | .............. | B01D 33/073 |
| 2013/0277289 A1 * | 10/2013 | Ettlinger | ............... | B01D 33/06 |
| | | | | 210/396 |

FOREIGN PATENT DOCUMENTS

| | | | |
|---|---|---|---|
| AT | 413497 B | 3/2006 |
| CN | 103260850 A | 8/2013 |
| DE | 9490017 U1 | 2/1996 |
| DE | 20210115 U1 | 11/2003 |
| EP | 3266587 A1 | 1/2018 |
| GB | 2027605 A | 2/1980 |
| WO | 2008031127 A1 | 3/2008 |
| WO | 2012079993 A2 | 6/2012 |

* cited by examiner

*Primary Examiner* — Hayden Brewster
(74) *Attorney, Agent, or Firm* — McGlew and Tuttle, P.C.

(57) ABSTRACT

A discharge device is for a filtering device for separating impurities from a material melt, in particular a low-viscosity polymer melt. The discharge device includes a discharge shaft with a pressure screw conveyor and a discharge head. Also disclosed is a filtering device including a cylindrical drum filter, a scraper and such a discharge device.

17 Claims, 2 Drawing Sheets

A - A

B - B

DISCHARGE TECHNOLOGY FOR PLASTIC FILTERS

CROSS REFERENCE TO RELATED APPLICATIONS

This application is a United States National Phase Application of International Application PCT/EP2021/083748, filed Dec. 1, 2021, and claims the benefit of priority under 35 U.S.C. § 119 of German Application 20 2020 107 526.8, filed Dec. 23, 2020, the entire contents of which are incorporated herein by reference.

TECHNICAL FIELD

The invention is in the field of filtering devices and discharge devices for filtering devices for separating impurities from a material melt, in particular a polymer melt, the discharge device being configured to discharge separated material from a filter chamber of the filtering device.

BACKGROUND

Filtering devices are used in the processing of plastics to increase the purity of the processed plastic and to separate out impurities from a starting material. Especially in the reuse of recycled plastics, filtering devices are used to separate impurities from plastic waste.

In plastics technology, for example, plastics are melted or plasticized in an extruder for further processing. The molten material can be further processed in various ways. The filtering device can, for example, be used downstream of an extruder. Various processes and filtering devices for filtering contaminated polymer melts are known in the prior art.

A material melt within the meaning of the present disclosure preferably refers to a plastic melt or polymer melt. Such material melts usually have a melting temperature above 100° C. and are processed hot. The material melt may also be another pasty mass, regardless of the material and/or melting temperature. The invention is also suitable for pasty masses other than plastic melts. The melting point of the material melt may also be close to or below the usual ambient temperature of about 20° C., so that the material melt would be colloquially referred to as cold or just warm. In particular, the material melt can be a pasty mass from the food sector, cosmetics, everyday consumer goods or pharmaceuticals.

The starting material preferably consists of a material melt of the desired base plastic (e.g. PE, PP, PS, PA or PET) and additional substances with which the starting material is contaminated. Depending on the material, its origin and the recycling cycle, the degree of contamination of the starting material can vary, e.g. from 1% to 20% of the mass.

The processing of such contaminated starting materials requires suitable filters and processes, and a particular challenge lies in the different material properties of the various plastics.

To filter the starting material, a filter with a filter screen is used through which the material melt is pressed. Impurities settle on the filter surface. The filter screen is configured in such a way that, as far as possible, only the pure plastic melt passes through the filter screen. During the filtering process, the material separated by the filter collects in the filter chamber. In order to prevent clogging of the filter, the separated material must be removed, whereby various techniques for removal are known. The discharge of the separated material from the filter chamber can take place continuously (e.g. by removal) or at intervals (e.g. by regular rinsing or changing of the filter screen).

In the filtered material downstream of the filter screen, residues of the impurities that were not completely separated by the filter screen may still remain. Filtering reduces the contamination to a sufficiently low level for further processing or eliminates it completely. It is also possible that residues of the base plastic remain in the separated and discharged material, also known as dirt cake, in addition to the filtered-out impurities. The aim of filtration is to separate the contamination as purely as possible with as little loss of the base plastic as possible.

Continuous removal of the separated material is particularly advantageous for uninterrupted operation of the filter. Rotating filters, e.g. drum filters or disc filters, are known from the prior art for this purpose. The separated material can be continuously removed from the rotating filter surface, e.g. by a scraper, and discharged from the filter chamber. Both stationary and moving (e.g. rotating) scrapers, which are moved relative to the filter surface, are known for removing the separated material. In drum filters, the feed material is often supplied from the outside, i.e. radially, and forced through a cylindrical filter into its interior. Impurities separated by the filter remain on the outside of the filter. Disc filters are also known in which the starting material is pressed in the axial direction through a rotating disc filter.

DE 94 90 017 U1, for example, discloses a filtering device with scrapers arranged between two disc filters on a rotating disc.

DE 202 10 115 U1 discloses a filtering device with a rotating drum filter and a scraper resting against its outer surface.

To discharge the impurities removed by the filter, both fonts use discharge screws that carry the removed material mixture directly into the environment, where the outflowing material can be collected in a continuous stream.

Depending on the type of plastic and process parameters, the viscosity of the material melt can vary. The processing of relatively low-viscosity material melts, i.e. melts with a low viscosity in SI units (e.g. Pa s) or a high viscosity number in WWI, e.g. when processing PA or PET plastics, presents a particular challenge for the design of suitable filtering devices.

The processability of plastics depends, among other things, on the viscosity, i.e. the toughness, of the material melt. In particular, the conveying pressure in the filtering device or the feed pressure of an upstream extruder can be considerably lower for low-viscosity material melts (e.g. PA or PET) than for viscous material melts. The conveyability by friction-dependent conveying means such as screws is strongly dependent on the internal and external friction of the conveyed materials, which is expressed in their viscosity.

The filtering devices known from the prior art with simple discharge screws, which convey the removed material mixture directly into the environment, have several disadvantages, especially for low-viscosity plastic melts. On the one hand, the opening at the end of the screw allows air to enter the filter chamber, which can lead to undesirable reactions. Secondly, the material discharge is unmetered. Other dosing discharge devices are unsuitable for low-viscosity material melts because of the low pressure.

SUMMARY

It is an object of the present invention to disclose an improved technique for filtering material melts and discharging separated material from the filter chamber.

The present invention is particularly suitable for filtering low viscosity material melts, e.g. PA and PET.

In experiments, it has been found that the pressure in the filter chamber is substantially lower for thin-bodied material melts than for viscous material melts. The pressure in the filter chamber depends, among other things, on the feed pressure of the feeding machine, e.g. an upstream extruder. The thinner the material melt, the less feed pressure friction-dependent conveying equipment such as screws build up in the extruder. In practice, the pressure in the filter chamber when filtering PA or PET, for example, can be a relatively low 10 to 20 bar.

Especially with extruders that are not designed for low-viscosity material melts, the feed pressure for a downstream filtering device may be insufficient. The use of special extruders that provide sufficient feed pressure even for thin-bodied material melts is often more expensive. It particular advantage of the present invention is compatibility with widely applicable and/or inexpensive extruders for filtering contaminated material melts.

For the operation of pressure-dependent discharge units, e.g. for metering units with piston stroke, the internal pressure of the filter may be too low under certain process conditions to ensure reliable discharge of the filter deposits.

Especially when processing a hot molten material, it is also desirable not to expose the molten material to the ambient air in order to avoid undesirable oxidation or other reactions of the material being processed. When discharging the separated material from the filter chamber, sealing the filter chamber is therefore a particular challenge.

Both a discharge device and an adapted filtering device having such a discharge device are disclosed.

A particularly advantageous aspect of the invention is the combination of a portioning discharge head with an upstream pressure screw conveyor of the discharge device.

The discharge device according to the invention is configured to discharge separated material from a filter chamber of a filtering device. The filtering device serves to separate impurities from the material melt. The molten material is fed under pressure to the filter chamber of the filtering device via a material feed. In the filter chamber, the supplied molten material is pressed under pressure through a filter screen of the filter.

Impurities are deposited at the surface of the filter screen due to their material properties. The impurities should be discharged from the filter chamber as quickly as possible.

To prevent clogging of the filter, the discharge device discharges the separated material, usually a mixture of separated impurities and pure material, from the filter chamber. Depending on the starting material, the separated material has a viscous, mushy consistency.

The discharge device comprises of a discharge shaft with a pressure screw conveyor and a discharge head. Preferably, the discharge head is arranged on the discharge shaft with the pressure screw conveyor.

The discharge head of the discharge device is preferably arranged in the conveying direction at the end of the pressure screw conveyor, so that the pressure screw conveyor conveys material from the filter chamber in the direction of the discharge head, thereby increasing the pressure.

By rotating the discharge shaft, the material collected in the filter chamber is conveyed by the pressure screw conveyor towards the discharge head. The pressure screw conveyor is connected between the filter chamber and the discharge head. If required, one or more further components, e.g. pipe sections or deflectors, can be arranged between the pressure screw conveyor and the discharge head. In the preferred embodiment, the discharge head sits directly on the shaft of the pressure screw conveyor.

The discharge head preferably comprises one or more discharge pistons. The discharge pistons are slidably mounted in the discharge head and have an axial stroke within the discharge head. By displacing the discharge piston in the discharge head, discharged material can be picked up on one side of the discharge head and discharged through an opening after a partial rotation.

Preferably, the discharge head is configured to produce a portioned, i.e. metered, discharge. Depending on the size and stroke of the discharge head, a predetermined volume is discharged per revolution. For example, with one revolution of the discharge shaft, each discharge piston can complete a double stroke and, with two discharge pistons, four times the stroke volume per revolution can thus be discharged from the filtering device.

A particular advantage of the discharge head lies in the portioned, i.e. controllable, discharge of material from the filter chamber, which can be sealed off from the environment. However, especially in the case of relatively low-viscosity material melts, the pressure present in the filter chamber may not be sufficient to actuate the discharge head, in particular the discharge pistons. The discharge device disclosed here combines a pressure screw conveyor on the discharge shaft with a portioning discharge head. With the pressure screw conveyor, the conveying pressure applied to the discharge head can be increased sufficiently to ensure portioning discharge of the discharge head.

The pressure screw conveyor properties can be designed by suitable configuration of the screw, in particular the pitch and the volume flow conveyed in the screw.

Advantageously, the discharge head, in particular with a discharge housing, forms an accumulation volume at the end of the pressure screw conveyor. The discharge device is configured to convey discharged material into the accumulation volume of the discharge head, thereby increasing the pressure of the material to be discharged at the discharge head relative to the filter chamber.

Preferably, the pressure within the conveying chamber is increased from 10 to 20 bar to a discharge pressure of 40 to 50 bar.

The combination of the continuously conveying pressure screw conveyor with a portioning discharge head is particularly advantageous for continuously removing deposits on the surface of the filter screen and at the same time controlling the material discharge and sealing the filter chamber against surrounding air.

The present invention can be configured both as a separate discharge device, for example for retrofitting or converting a filtering device, or as an entire filtering device with such a discharge device. The discharge device is particularly suitable for use in a filtering device having a filter, in particular a rotating drum filter or disc filter, and a scraper. With the scraper, the separated material is preferably scraped off at the surface of the rotating filter screen and collected at the scraper. Preferably, the pressure screw conveyor of the discharge device is arranged in the area of the scraper, so that the scraped-off material is fed to the pressure screw conveyor and discharged by it.

The filtering device for separating impurities from a molten material comprises a housing, a filter and a filter chamber at the surface of the filter, and a discharge device. The discharge device with the discharge shaft, the pressure screw conveyor and the discharge head is arranged on the filter of the filtering device in such a way that a material flow from the filter chamber into the conveying chamber of the pressure screw conveyor is possible. Preferably, the discharge device, in particular the pressure screw conveyor, is arranged on the outside of a drum filter in a wall of the housing of the filtering device. This arrangement allows reliable discharge of the separated material from the filter chamber and easy replacement of the components for maintenance purposes.

Further advantageous features and embodiments of the invention are disclosed in the subsidiary claims and drawings. The features disclosed for the discharge device are also to be understood as direct features of the filtering device. A detailed description of the invention and embodiments follows with reference to the drawings.

The invention is illustrated in the drawings by examples and schematics. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
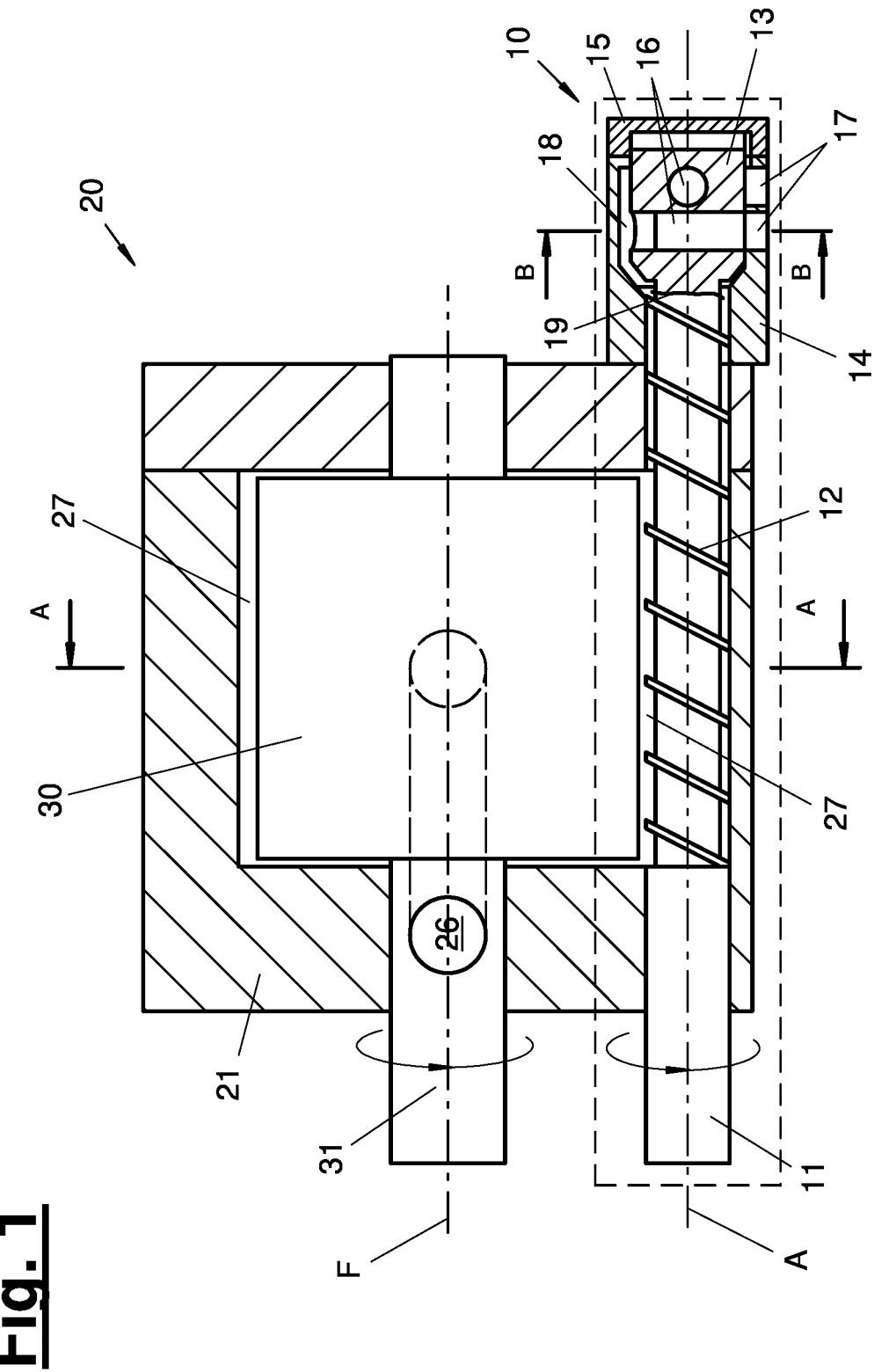
FIG. 1 is a longitudinal sectional view through a filtering device (20) with a filter (30) and a discharge device (10)

Referring to the drawings, FIG. 1 shows a preferred embodiment of a filtering device (20). The filtering device (20) comprises a housing (21), a filter (30) with a filter shaft (31) and a discharge device (10).

Figures 2, 3:
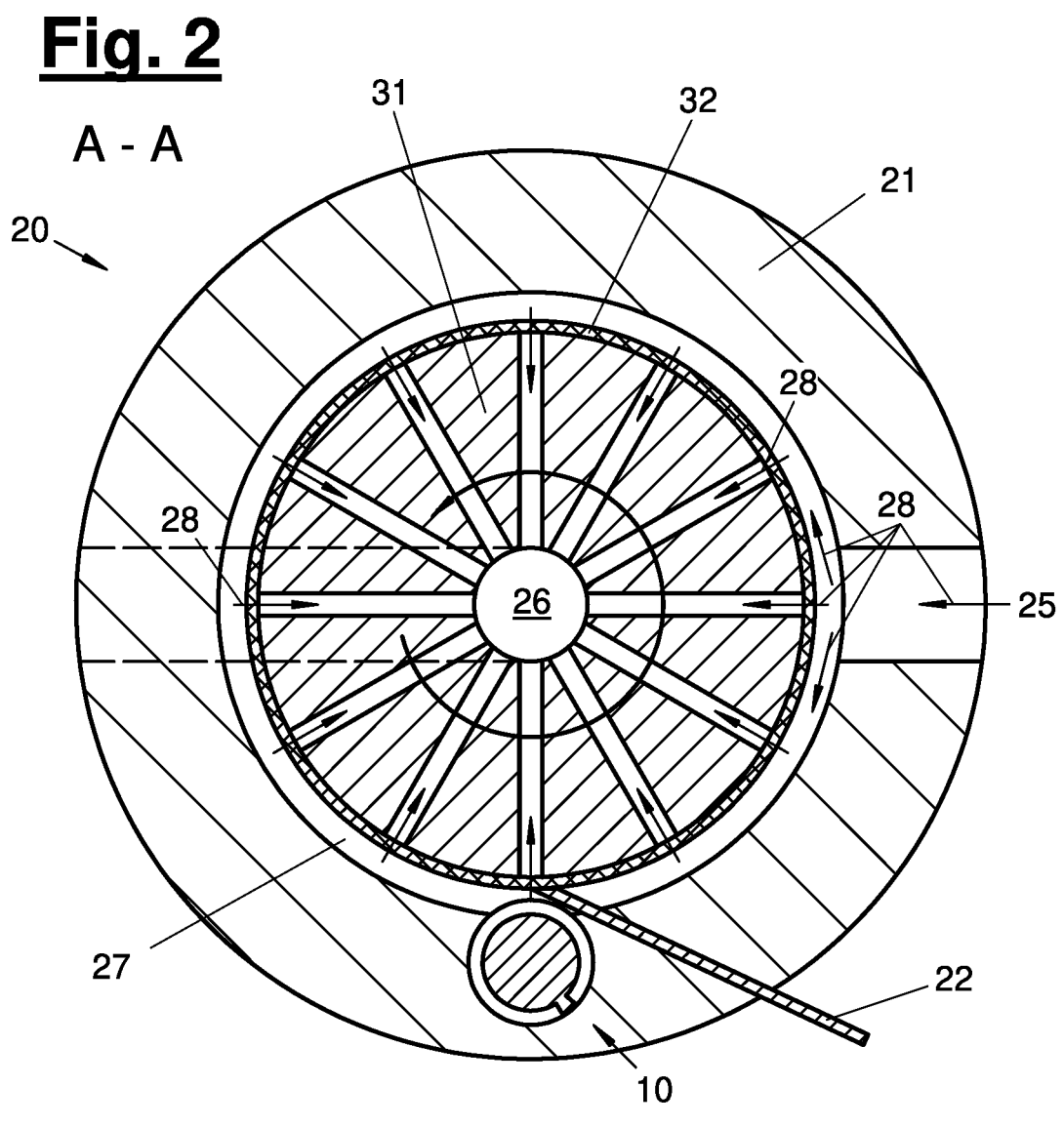
FIG. 2 is a cross-sectional view of the filtering device (20) along the line of intersection A-A.
FIG. 3 is a cross-sectional view through the discharge device at the level of the discharge head (13) along the line of intersection B-B.

The filter (30) is preferably configured as a rotating drum filter. The filter chamber (27) is formed at the surface of the filter (30) within the housing (21) of the filtering device. The typical material flow for filtering the molten material is shown in FIGS. 1 and 2. The feed material is conveyed under pressure into the filter chamber (27) by a material feed (25). Preferably, the material feed is from the outside, for example via a radial feed through the housing (21). The supplied material is distributed in the filter chamber (27) on the surface of the filter (30). The filter (30) preferably comprises a permeable filter screen (32), which is located on a rotating filter shaft (31).

The molten material is forced through the filter screen (32) under pressure, leaving impurities of the material at the surface of the filter screen in the filter chamber (27) due to their material properties. The filtered material passes through the filter screen (32) and flows in the direction of the material discharge (26). In the preferred embodiment, the filtered material is discharged through the filter shaft (31). For this purpose, the filter shaft (31) comprises suitable channels between the contact surface of the filter screen (32) and the internal material discharge (26).

In FIG. 2, the material flow (28) of the filtered material from the material feed (25) to the material discharge (26) is indicated by arrows.

At the surface of the filter screen (32), the substances separated from the starting material collect. Due to the rotation of the filter shaft (31) and the filter screen (32), the separated material is conveyed towards the discharge device (10) and the scraper (22). The scraper (22) presses on the surface of the filter screen (32). The scraper (22) is arranged like a scraper at the surface of the filter screen (32). Due to the rotation of the filter shaft (31), the material adhering to the surface of the filter screen (32) is removed by the scraper (22). Preferably, the discharge device (10) is arranged in the area of the scraper (22) on the filter chamber (27), so that the scraped-off material is picked up and conveyed away by the pressure screw conveyor (12).

The pressure screw conveyor (12) of the discharge device (10) is preferably formed by a circumferential helix at the surface of the discharge shaft (11). By rotating the discharge shaft (11) and the screw configured thereon, the material is conveyed in the axial direction of the discharge axis (A) out of the filter chamber (27) in the direction of the discharge head (13).

The discharge head (13) is preferably arranged in a discharge housing (14). The discharge housing (14) can be configured both as part of the housing (21) of the filtering device and as a separate discharge housing (14). The separate design of the discharge housing (14) is particularly advantageous for the maintainability and replacement of parts of the discharge device (10). Preferably, the discharge housing (14) is tightly attached to the housing and/or a cover of the housing (21) of the filtering device.

The discharge head (13) is preferably mounted in the discharge housing (14) so that it slides and seals against the ambient air. The discharge unit (10) forms an accumulation volume (18) in the area of the discharge head (13). The separated material is conveyed into the accumulation volume (18) by the pressure screw conveyor (12). In the accumulation volume (18), the pressure is increased to a sufficient level to overcome the static friction of the discharge pistons (16) in the discharge head (13).

Especially in the case of low-viscosity material melts, only by increasing the accumulation pressure at the discharge head (13) can the movement of the discharge pistons be ensured for metered material discharge.

FIG. 3 shows the stroke movement of the discharge piston (16) in a cross-section of the discharge head (13). Depending on the desired discharge volume and the periodicity of the discharge per revolution, one or more discharge pistons (16) can be provided.

With one rotation of the discharge shaft (11) and the discharge head (13), the discharge head takes up a stroke volume (H) from the accumulation volume (18), conveys it over a partial revolution in the direction of a discharge opening (17), and ejects the volume to the surroundings through the discharge opening (17) by an opposite stroke. Advantageously, the discharge opening (17) and the accumulation volume (18) are arranged opposite or slightly offset from each other so that the accumulation pressure in the accumulation volume (18) ensures ejection of the dirt cake through the discharge opening (17). With the stroke of the discharge piston (16), material is simultaneously taken up from the accumulation volume (18) and a corresponding volume is ejected through the discharge opening (17) on the opposite side.

The bores in the discharge head (13) and the discharge housing (14) are preferably designed in such a way that the discharge piston (16) is held positively in the discharge head (13) and cannot escape through the discharge opening (17).

The discharge housing (14) preferably comprises a cover (15). The discharge housing (14) can advantageously comprise an overflow channel on the bearing surface of the discharge head (13) in the discharge housing (14). Leakage material can flow off through the overflow channel.

In a particularly advantageous embodiment, the discharge device (10) is of modular design. Preferably, the discharge device (10) comprises a modular connection interface (19) between the pressure screw conveyor (12) and the discharge head (13).

Preferably, the discharge head (13) is detachably mounted on the discharge shaft (11). In a particularly advantageous embodiment, different pressure screw conveyors (12) and discharge heads (13) can be combined. The different embodiments of the pressure screw conveyor (12) and discharge head (13) have a uniform connection interface (19) for this purpose. In this way, for example, different discharge volumes and pressure gradients can be achieved by selecting and combining different pressure screw conveyors and discharge heads.

Preferably, the discharge head (13) is detachably arranged on the discharge shaft (11). Alternatively, the discharge shaft can be configured in one piece with the pressure screw conveyor (12) and the discharge head (13).

A particular advantage of the embodiment shown in FIG. 1 is the separation of the filter shaft (31) and the discharge shaft (11). The discharge shaft (11) is preferably arranged parallel to and radially offset from the filter shaft (31). With the separate discharge shaft (11), the material discharge through the discharge device (10) can be controlled separately from the rotational speed of the filter (30) and its filter shaft (31).

The combination of a rotating filter (30), in particular a drum filter, with a discharge device (10) with a discharge shaft (11) is also particularly advantageous for a precisely controllable filter process.

The discharge device (10) is preferably arranged on the outside of an externally loaded drum filter. It is particularly advantageous to combine the discharge device (10) with a filtering device with a static scraper (22) on a rotating filter screen (32).

With the discharge device (10) and the filtering device (20) according to the invention, even polymer melts that are difficult to filter, in particular PA or PET, can be filtered reliably and with precise control.

Compared to a previously known discharge device, the discharge device (10) disclosed here has the advantage that the continuously discharging pressure screw conveyor (12) conveys against an accumulation volume (18) which is sealed off from the ambient air by the discharge head (13), the discharge housing (14) and the discharge pistons (16).

The use of a discharge head with discharge piston alone, without an upstream pressure screw conveyor, would not build up sufficient internal pressure to actuate the discharge head in the case of low-viscosity polymer melts. A discharge screw alone, on the other hand, would not achieve sufficient sealing of the filter chamber (27) from the surrounding air. Especially in the case of low-viscosity polymer melts, conveying against a sealed accumulation volume is particularly advantageous.

Another particular advantage of the discharge device (10) disclosed here lies in the separation of the scraper function and the discharge function. The scraper (22) in contact with the rotating filter screen (32) is subject to particular mechanical stresses. A static scraper that is easy to position and replace is particularly advantageous in this respect. In the proposed invention, the discharge device (10) and the scraper (22) can be adjusted and maintained separately and/or together.

Preferably, the scraper (22) extends along the entire axial length of the filter screen (32). Preferably, the scraper (22) separates the filter chamber (27) in the tangential flow direction of the material along the surface of the filter screen (32) after approximately three quarters of the circumference starting from the material feed. In this way, the material deposited on the filter surface is collected along a large part of the filter rotation and reliably discharged by the discharge device (10). In the direction of rotation downstream of the scraper (22), the filter screen (32) is again free of separated material when it reaches the material feed (25).

The shown and/or described features and embodiments of the discharge device (10) and filtering device (20) can be used individually or in combination with each other. In particular, the invention is not limited to the embodiment shown. Individual features may be added, omitted, or substituted with the remaining features disclosed herein. Preferably, the invention is configured as a filtering device with the discharge device according to any one of the claims. However, the discharge device can also be used as a separate assembly, for example for retrofitting or converting a filtering device. Therefore, both a discharge device and a filtering device are claimed.

While specific embodiments of the invention have been shown and described in detail to illustrate the application of the principles of the invention, it will be understood that the invention may be embodied otherwise without departing from such principles.

LIST OF REFERENCE NUMERALS

10 discharge device
11 discharge shaft
12 pressure screw conveyor
13 discharge head
14 discharge housing
15 cover
16 discharge piston
17 discharge opening
18 Accumulation volume
19 connection interface
20 filtering device
21 housing
22 scraper
25 material feed
26 material discharge
27 filter chamber
28 material flow
30 filter
31 filter shaft
32 filter screen
F filter axis
A discharge axis
H stroke

The invention claimed is:

1. A discharge device for a filtering device for separating impurities from a material melt, the discharge device being configured to discharge separated material from a filter chamber of the filtering device, the discharge device comprising:

a discharge housing;
a discharge shaft with a pressure screw conveyor; and
a discharge head, wherein the discharge head is arranged in the discharge housing, and wherein the discharge head is further arranged at an end of the pressure screw conveyor and sits directly on the discharge shaft of the pressure screw conveyor, and wherein the discharge head comprises at least one discharge piston.

2. The discharge device according to claim 1, wherein the discharge head comprises a dosing discharge head.

3. The discharge device according to claim 1, wherein the discharge head seals off the filter chamber and/or the pressure screw conveyor from the environment.

4. The discharge device according to claim 1, wherein the pressure screw conveyor is configured to convey material into the discharge head while increasing the pressure.

5. The discharge device according to any claim 1, wherein the discharge head is configured to produce a portioned and/or intermittent discharge of material.

6. The discharge device according to claim 1, wherein the discharge piston is slidably mounted in the discharge head.

7. The discharge device according to claim 1, wherein material discharge can be controlled, to provide a dosed material discharge, by the rotational speed of the discharge shaft and/or by the stroke of the at least one discharge piston in the discharge head.

8. The discharge device according to claim 1, wherein the discharge housing comprises at least one discharge opening, wherein the discharge opening is associated with the at least one discharge piston.

9. The discharge device according to claim 1, wherein the discharge device forms an accumulation volume at the discharge head.

10. The discharge device according to claim 1, wherein the discharge head and/or the discharge housing and/or the at least one discharge piston, is configured to seal off the filter chamber from the environment.

11. The discharge device according to claim 1, wherein the pressure screw conveyor is arranged between the filter chamber and the discharge head.

12. The discharge device according to claim 1, wherein the pressure screw conveyor is configured to generate a pressure gradient between the filter chamber and the discharge head, from a filter pressure in the range from 10 to 20 bar to a discharge pressure in the range from 40 to 50 bar.

13. The discharge device according to claim 1, wherein the pressure screw conveyor is configured as a helix on the discharge shaft.

14. The discharge device according to claim 1, wherein the discharge head is detachably fastened to the discharge shaft.

15. The discharge device according to claim 1, wherein the pressure screw conveyor, is configured to generate an accumulation pressure at the discharge head.

16. The discharge device according to claim 1, wherein a stroke of a discharge piston is actuated by an accumulation pressure at the discharge head built up by means of the pressure screw conveyor, in particular increased with respect to the filter chamber.

17. A filtering device for separating impurities from a material melt, the filtering device comprising:

a housing;

a filter;

a filter chamber at the surface of the filter; and a discharge device that is configured to discharge separated material from the filter chamber, the discharge device comprising: a discharge housing; a discharge shaft with a pressure screw conveyor; and a discharge head, wherein the discharge head is arranged in the discharge housing, and wherein the discharge head is further arranged at an end of the pressure screw conveyor and sits directly on the discharge shaft of the pressure screw conveyor, and wherein the discharge head comprises at least one discharge piston.

* * * * *